(12) United States Patent
Carter et al.

(10) Patent No.: US 8,010,698 B2
(45) Date of Patent: Aug. 30, 2011

(54) NETWORK APPLICATION LAYER ROUTING (75) Inventors: Stephen R. Carter, Spanish Fork, UT (US); Ravishankar Krishnamurthy, Karnataka (IN); Duraisamy Veeravadivel, Mettupalayam (IN)

(73) Assignee: Novell Inc., Provo, UT (US)

( * ) Notice: Subject to any disclaimer, the term of this patent is extended or adjusted under 35 U.S.C. 154(b) by 629 days.

(21) Appl. No.: 11/843,000

(22) Filed: Aug. 22, 2007

(65) Prior Publication Data
US 2007/0288652 A1 Dec. 13, 2007

Related U.S. Application Data (63) Continuation-in-part of application No. 10/909,633, filed on Aug. 2, 2004, now Pat. No. 7,376,134.

(51) Int. Cl.
*G06F 15/173* (2006.01)
*H04L 12/28* (2006.01)
(52) U.S. Cl. .................. 709/240; 709/238; 370/351
(58) Field of Classification Search .......... 709/240, 709/238; 370/351
See application file for complete search history.

(56) References Cited

U.S. PATENT DOCUMENTS

| | | |
|---|---|---|
| 5,109,510 A | 4/1992 | Baker et al. |
| 6,009,081 A | 12/1999 | Wheeler et al. |
| 6,038,306 A | 3/2000 | Spahl et al. |
| 6,055,236 A | 4/2000 | Nessett et al. |
| 6,401,129 B1 | 6/2002 | Lenander |
| 6,577,723 B1 | 6/2003 | Mooney |
| 6,611,872 B1 * | 8/2003 | McCanne ............ 709/238 |
| 6,654,381 B2 | 11/2003 | Dally et al. |
| 6,665,730 B1 * | 12/2003 | Michelson et al. .......... 709/238 |
| 6,678,273 B1 | 1/2004 | Brown |
| 6,728,272 B1 | 4/2004 | Hosein |
| 6,738,814 B1 | 5/2004 | Cox et al. |
| 6,842,772 B1 | 1/2005 | Delaney et al. |
| 6,882,643 B1 | 4/2005 | Mauger et al. |
| 7,113,581 B2 * | 9/2006 | Benedyk et al. ............ 379/219 |
| 7,315,897 B1 * | 1/2008 | Hardee et al. ............... 709/229 |
| 7,376,134 B2 | 5/2008 | Carter et al. |
| 7,400,903 B2 * | 7/2008 | Shoemake et al. ......... 455/552.1 |
| 2002/0061011 A1 | 5/2002 | Wan |
| 2002/0094081 A1 | 7/2002 | Medvinsky |
| 2002/0136204 A1 | 9/2002 | Chen et al. |
| 2003/0061234 A1 | 3/2003 | Ali et al. |
| 2003/0105800 A1 | 6/2003 | Cullen |
| 2003/0179704 A1 | 9/2003 | Lakkakorpi |
| 2004/0268175 A1 | 12/2004 | Koch et al. |
| 2005/0157722 A1 * | 7/2005 | Yoshimoto et al. .......... 370/392 |
| 2006/0005237 A1 | 1/2006 | Kobata et al. |

(Continued)

OTHER PUBLICATIONS

"U.S. Appl. No. 10/909,633 Response filed Dec. 27, 2007 in response to Non-Final Office Action mailed Sep. 27, 2007", 9 pgs.

(Continued)

*Primary Examiner* — Patrice L Winder
*Assistant Examiner* — Asghar Bilgrami
(74) *Attorney, Agent, or Firm* — Schwegman, Lundberg & Woessner, P.A.

(57) ABSTRACT

Techniques for network application layer routing are provided. Requests for services are inspected at an application layer of a network. A priority for a requestor is obtained and in response to the priority the requests are routed to particular processing environments. Depending on the priority the processing environments may be high performing or low performing.

13 Claims, 3 Drawing Sheets

U.S. PATENT DOCUMENTS

2006/0034179 A1 2/2006 Carter et al.

OTHER PUBLICATIONS

"U.S. Appl. No. 10/909,633 Non-Final Office Action mailed Sep. 27, 2007", 18 pgs.

"U.S. Appl. No. 10/909,633 Notice of Allowance mailed Feb. 25, 2008", 6 pgs.

"European Search Report", European Search Report Received in EP05104253, (Nov. 9, 2005),3 pgs.

Kurzyniec, Dawid, et al., "On the Viability of Component Frameworks for High Performance Distributed Computing: A Case Study", ISBN: 0-7695-1686-6. *High Performance Distributed Computing*, 2002, HPDC-11 2002., Proceedings, 11th IEEE International Symposium on Jul. 23-26, 2002, Piscataway, NJ, USA, IEEE. XP010601184,(Jul. 23, 2002),pp. 275-283.

Malawski, Maciej, et al., "MOCCA—Towards a Distributed CCA Framework for Metacomputing", ISBN: 0-7695-2312-9. *Parallel and Distributed Processing Symposium*, 2005. Proceedings, IEEE International, Denver, CO, USA, Apr. 4-8, 2005, Piscataway, NJ, USA, XP010785717,(Apr. 4, 2005),8 pgs.

Migliardi, Mauro, et al., "Heterogeneous Distributed Virtual Machines in the Harness Metacomputing Framework", ISBN: 0-7695-0107-9. *Heterogeneous Computing Workshop*, 1999, HCW '99., Proceedings, Eighth San Juan, Puerto Rico Apr. 12, 1999, Los Alamitos, CA, USA, IEEE Comput. Soc., US, XP010333332,(Apr. 12, 1999),pp. 60-72.

Migliardi, Mauro, et al., "Standards Based Heterogeneous Metacomputing: The Design of HARNESS II", ISBN: 0-7695-1573-8. *Parallel and Distributed Processing Symposium, Proceedings International IPDPS 2002*., Ft. Lauderdale, FL, USA Apr. 15-19, 2002, Los Alamitos, CA, USA, IEEE Comput. Soc. XP010591111,(Apr. 15, 2002),pp. 84-96.

Sunderam, Vaidy, et al., "Lightweight Self-Organizing Frameworks for Metacomputing", ISBN 0-7695-1686-6. *High Performance Distributed Computing*, 2002. HPDC-11 2002. Proceedings, 11th IEEE International Symposium., Jul. 23-26, 2002, Piscataway, NJ. XP 0769516866,(Jul. 23, 2002),pp. 113-122.

\* cited by examiner

NETWORK APPLICATION LAYER ROUTING

RELATED APPLICATIONS

The present invention is a continuation-in part of U.S. Ser. No. 10/909,633 and entitled "Privileged Network Routing," filed on Aug. 2, 2004 U.S. Pat. No. 7,376,134; the disclosure of which is incorporated by reference herein.

BACKGROUND

Networks are rapidly becoming overloaded and taxed with traffic from governments, organizations, and private individuals. In particular, the Internet is increasingly being used to conduct business, acquire information, and for leisure. Moreover, there have been recent governmental efforts made to ensure all participants within the United States have affordable access to high speed connectivity to the Internet. However, if every participant were to have a high speed connection to the Internet, then websites will become even more overtaxed and not be capable of supporting the increased speed with which transactions are received and processed.

To respond to this overtaxing situation, enterprises have replicated services delivered over the WWW to provide multiple access points. The access points are hidden from the users whom believe they are accessing a single WWW site. In some cases, enterprises have also seen this situation as an opportunity to increase revenue by selling high-end services, such as Virtual Private Network (VPN) connections to their services, and the like. But even upscale and paid for VPN's are becoming overburdened with the rapidly expanding commerce of the Internet.

Generally, when a request for an enterprise's service is received at a WWW site of the enterprise, the request is routed at a low level network connection, such as the transport layer in response to some load-balancing application. But higher-level attributes associated with the request are often ignored in this process. Thus, even higher-privileged users of the enterprise may not be able to change the level of service they receive from that enterprise.

In effect, there is no reliable way to differentiate a response time experienced by a privileged user of an enterprise versus that which is experienced by a non-privileged user of the enterprise. The designation of what is privileged versus what is non-privileged is often maintained at a network application layer that is at a much higher level of abstraction than where routing takes place.

Thus, what is needed is a mechanism for improved routing of network requests for services in order to properly address higher privileged users of those services.

SUMMARY

In various embodiments of the invention, techniques are presented for network application layer routing of service requests. More specifically and in an embodiment, a method is provided for network application layer routing. A request is identified over a network from a principal. The request directed to a particular service. Next, a priority for the request is resolved at an application layer of the network. Finally, the request is routed, in response to the priority, to a processing environment having an instance of the particular service and thereby overriding an attempted routing of the request to a different processing environment having a different instance of the particular service. The attempted routing is done at a transport layer of the network.

DETAILED DESCRIPTION

A "resource" includes a user, content, a processing device, a node, a service, an application, a system, a schema definition, a directory, an operating system (OS), a file system, a data store, a database, a policy definition, a configuration definition, a file, content, a World-Wide Web (WWW) service, a WWW page, groups of users, a digital certificate, an attestation, combinations of these things, etc. The terms "service," "application," and "system" may be used interchangeably herein and refer to a type of software resource that includes instructions, which when executed by a machine performs operations that change the state of the machine and that may produce output.

A "principal" is a special type of resource that performs one or more actions against other resources. So a principal may be a user or an automated service.

In an embodiment, each resource is electronically defined and represented as having one or more attributes. Each attribute includes one or more name value pairs. For example, a server resource may include an attribute associated with its physical Internet Protocol (IP) address and that attribute may be represented by the following name value pair: "IP=100.1.1.10." The server resource may also have its own identity (discussed below) and may include other attributes such as whether the IP address is static or dynamic, etc. Attributes may also include references to policy or even specific configuration details for a given processing environment that a resource is to be deployed to. Attributes may also include access privileges and/or roles that the resource is assigned to.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "network application layer" refers to the top layer of the network communication stack used in network communications. At this layer communication directly occurs with applications/services. In an Open Systems Interconnect (OSI) network communication architecture there are 7 layers of abstraction and communication associated with network communication. The lowest level or physical layer (Layer 1) defines all electrical and device specifications for the network communication. The next layer is the data link layer (Layer 2); this provides the functional and procedural means to transfer data between network entities (resources) and to detect and possibly correct errors that may occur at the physical layer. After the data link layer comes the network layer (Layer 3). Here, the functional and procedural means for transferring variable length data sequences from a source resource to a destination resource via one or more networks are defined. Following the network layer comes the transport layer (Layer 4); this provides for the transparent transfer of data between end users and includes quality of service details. Common Layer 4 services are the Transfer Control Protocol (TCP), User Datagram Protocol (UDP), and Stream Control Transfer Protocol (SCTP), and others. The fifth layer is called the session layer (Layer 5); here, control is maintained between dialogues/connections (sessions) and computing devices. The next layer is the presentation layer (Layer 6); this, transforms the data to provide a standard interface for the final layer, which is the application layer (discussed above).

Various embodiments of this invention can be implemented in existing network architectures, security systems, data centers, gateways, routers, bridges, proxies (reverse, transparent, and/or forward) and/or other network communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

Figure 1:
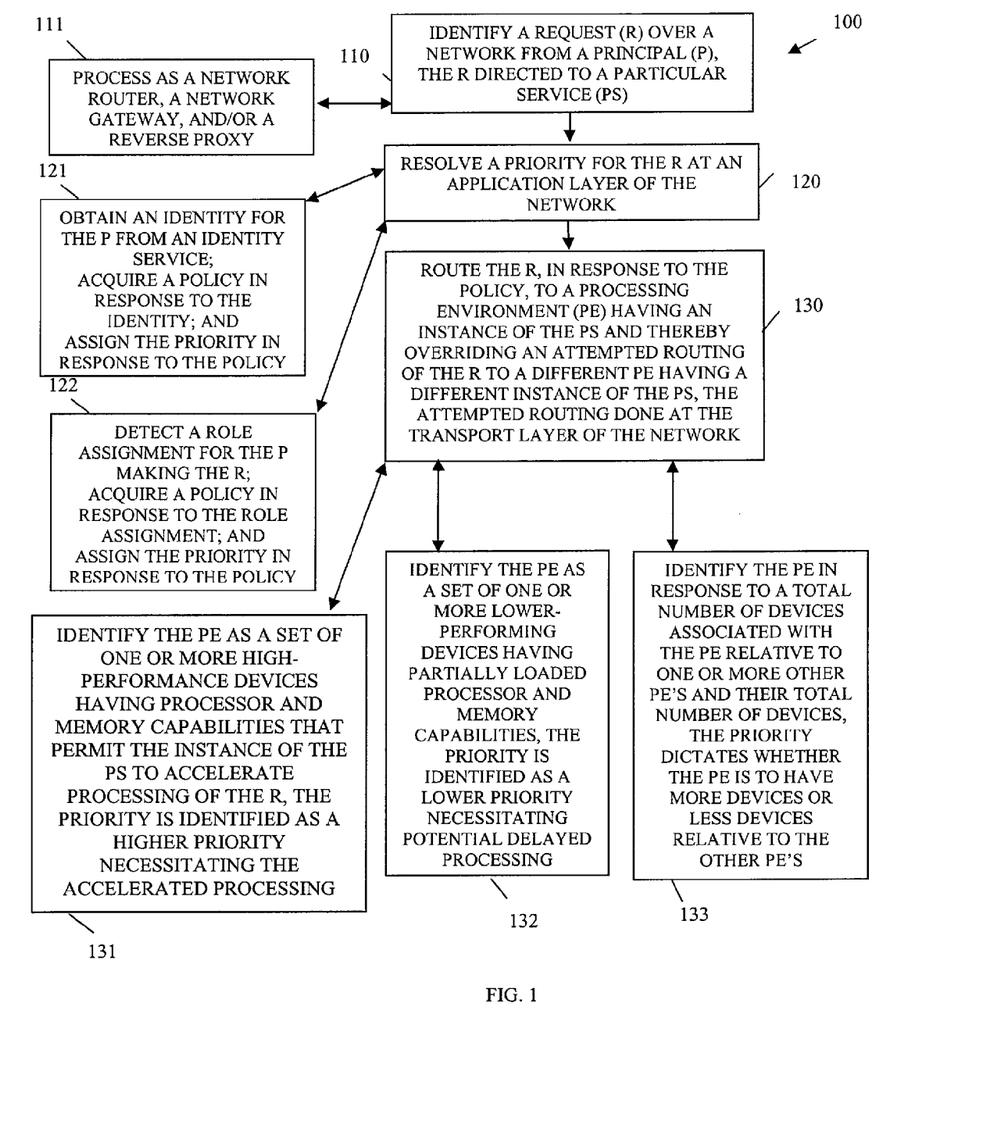
FIG. 1 is a diagram of a method for network application layer routing, according to an example embodiment of the invention.

FIG. 1 is a diagram of a method 100 for network application layer routing, according to an example embodiment of the invention. The method 100 (hereinafter "routing service") is implemented as instructions in a machine-accessible and readable medium. The instructions when executed by a machine perform the processing depicted in FIG. 1. The routing service is also operational over and processes within a network. The network may be wired, wireless, or a combination of wired and wireless.

As will be more fully described herein and below, the routing service determines where to route requests for particular services in response to network application layer attributes. This routing can be used to override that which would normally take place at the network transport layer.

At 110, the routing service identifies a request over a network from a principal. The request is directed to a particular service that the principal desires to access or desires to have some processing done on behalf of the principal.

In an embodiment, the network is the WWW over the Internet and the principal uses a browser to activate a Uniform Resource Locator (URL) link within the browser; the activation of the URL becomes the request, which includes a variety of metadata associated with the principal. Traversing the URL leads to a WWW site where the routing service is processing and identifies the request and the associated metadata.

According to an embodiment, at 111, the routing service processes on network node that is external to the principal as one or more of the following: a network router, a network gateway, and/or a reverse proxy.

At 120, the routing service resolves a priority for the request at an application layer of the network. That is, the priority for the principal and the request is resolved, determined, and assigned at the top level of the network communication stack. This can be done in a variety of manners.

For example, at 121, the routing service can obtain an identity for the principal from an identity service. The identity permits the routing service to acquire a policy and the policy permits the routing service to assign the priority to the request.

In another example, at 122, the routing service detects a privilege/access role assignment for the principal making the request. Next, the routing service acquires a policy in response to the role assignment and then assigns the priority to the request in response to the policy.

At 130, the routing service dynamically routes the request in response to the policy to a particular processing environment. That processing environment includes an instance of the particular service associated with the request. The dynamic routing overrides any attempted routing of the request that would normally occur at the transport layer of the network communication stack. The attempted routing is associated with a different processing environment having a different instance of the particular service associated with the request.

So, the routing service tricks, forces, and/or overrides normal Layer 4 load balancing and routing to route the request to a processing environment based on the priority of the request. This ensures that high and even low priority requests from privileged or non-privileged principals are handled in a manner consistent with what those principal expect. The priority processing and routing effectively occurs at the application layer, which for OSI is Layer 7.

According to an embodiment, at 131, the routing service identifies the processing environment for which the request is to be routed as a set of one or more high-performance devices having processor or memory capabilities that permit the instance of the particular desired service to accelerate processing of the request. In other words, a high performance server environment can be designated as more favorable for higher priority requests. In this example, the priority is identified as having a higher priority to necessitate the accelerated processing and thus to be associated with the high-performance devices (collectively representing the selected processing environment).

Conversely, in another embodiment, at 132, the routing service identifies the processing environment for which the request is to be routed as a set of one or more lower-performing devices having partially loaded or limited processor and memory capabilities. In this case, the priority is identified as a lower priority, which necessitates potential delayed processing that may be associated with selecting the lower-performing devices (collectively representing the selected processing environment).

It is also noted that what is designated as high-performing versus lower-performing processing environments can be determined in real time and dynamically when the request is processed. So, if one set of servers (first processing environment) is more loaded with high-priority jobs than another set of servers (second processing environment); the second processing may have more processing capabilities at that particular point in time even if the first set of servers has more actual hardware capabilities. In such a case, the routing service can dynamically and in real time, based on processing load, determine a higher priority request should be dynamically routed to the second processing environment and may at that point in time designate the second processing environment as the higher-performing processing environment.

In an entirely different situation, at 133, the routing service identifies the processing environment in response to a total number of devices associated with the processing environment relative to one or more other processing environments and their total number of devices. The priority dictates whether the selected processing environment is to have more devices (higher priority for the request) or less devices (lower priority for the request) relative to the other processing environments.

So, selection of the processing environment can be based on the total number of devices (processors) that each different processing environment has. For example, suppose a cluster of WWW servers M include m total number of servers and another cluster of WWW servers N include n total number of servers; where m is greater than n (m>n). If the request is of a high priority, then the routing service selects server cluster M as the selected processing environment. Conversely, if the request is of a lower priority, then the routing service selects server cluster N as the selected processing environment.

Figure 2:
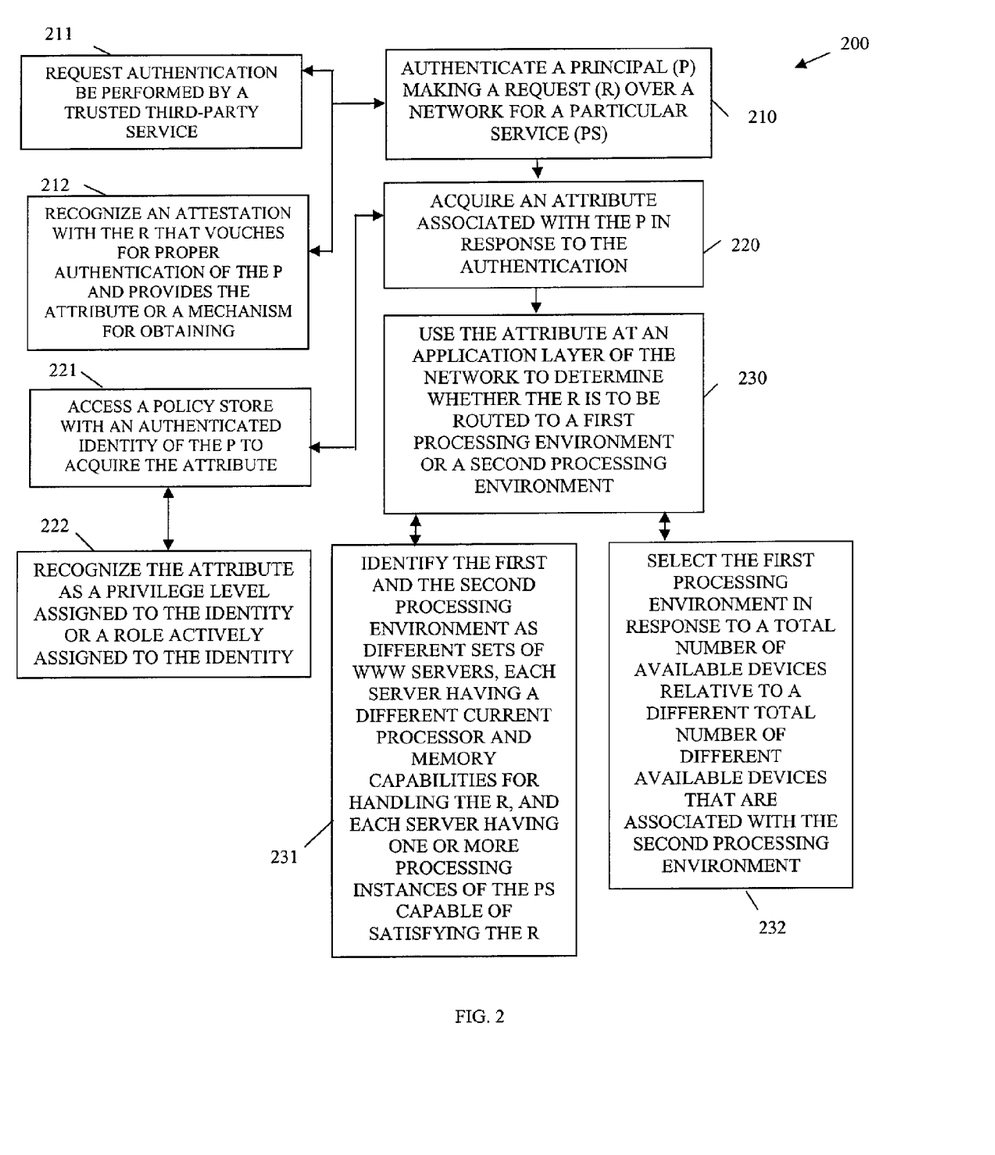
FIG. 2 is a diagram of another method for network application layer routing, according to an example embodiment of the invention.

FIG. 2 is a diagram of another method 200 for network application layer routing, according to an example embodiment of the invention. The method 200 (hereinafter "application layer routing service") is implemented as instructions in a machine-accessible and readable medium. The instructions when executed by a machine perform the processing depicted in FIG. 2. The application layer routing service is also operational over and processes within a network. The network may be wired, wireless, or a combination of wired and wireless.

The application layer routing service represents an alternative and in some cases enhanced perspective to the routing service represented by the method 100 discussed above with the FIG. 1.

At 210, the application layer routing service authenticates a principal who is making a request over a network for a particular service. The authentication can be achieved in a variety of manners.

For example, at 211, the application layer routing service requests that the authentication be performed by a trusted-third party service. In other words, the authentication may be offloaded to another resource, such as an identity service discussed and incorporated by reference herein and above.

In another situation, at 212, the application layer routing service recognizes an attestation with the request. The attestation vouches for the proper authentication of the principal. The attestation may also provide an attribute (discussed with reference to the processing at 220) or a mechanism for obtaining the attribute (e.g., table, repository, third-party service (identity service), etc.).

Other forms of authentication may be done as well, such as certificate verification, biometrics, passwords, etc. The authentication may be single factored or multi-factored depending upon the strength of the authentication desired or required by an authentication policy.

At 220, the application layer routing service acquires an attribute associated with the principal in response to the authentication. This of course assumes that the authentication was successful; if the authentication is not successful, then the processing may terminate (according to policy) and report notification or logging may proceed after the unsuccessful authentication.

Assuming the authentication was successful, the attribute associated with authentication can be acquired in a variety of manners, such as via an attestation, etc. In an embodiment, at 221, the attribute is acquired by accessing a policy store with an authenticated identity of the principal to obtain or resolve the attribute.

In one case, at 222, the application layer routing service recognizes the retrieved attribute as a privilege level assigned to the identity of the principal or an access role that is actively assigned to the identity. Processing associated with routing at the network application layer in response to identity, role, and/or privilege was discussed in detail above with reference to the routing service represented by the method 100 of the FIG. 1.

At 230, the application layer routing service uses the attribute at an application layer of the network communication architecture to determine whether the request is to be routed to a first processing environment or a second processing environment. The attribute can be any property or condition associated with the principal that permits the application layer routing service to resolve whether the request is to go to the first processing environment or the second processing environment.

According to an embodiment, at 231, the application layer routing service identifies the first and second processing environments as different sets or clusters of WWW servers. Each WWW server having a different currently available processor and memory capabilities for immediately handling the request. Furthermore, each server having one or more processing instances of the particular service that the request is associated with. Each server is therefore capable of satisfying the request.

In another case, at 232, the application layer routing service selects the first processing environment in response to a total number of available devices relative to a different total number of different available devices, which are associated with the second processing environment. In this example, if the attribute dictates accelerate access to the particular service, then the application layer routing service selects the first processing environment when it has more devices. If the attribute dictates normal or slower access, then the application layer routing service selects the first processing environment when it has less devices.

Once the first or second processing environment is selected by the application layer routing service, the application layer routing service dynamically causes the request to be routed to the selected processing environment for access to the particular and desired service requested by the principal. This occurs at the network application layer or is initiated at the network application layer and forced down through the lower level application layers to ensure that it happens.

Figure 3:
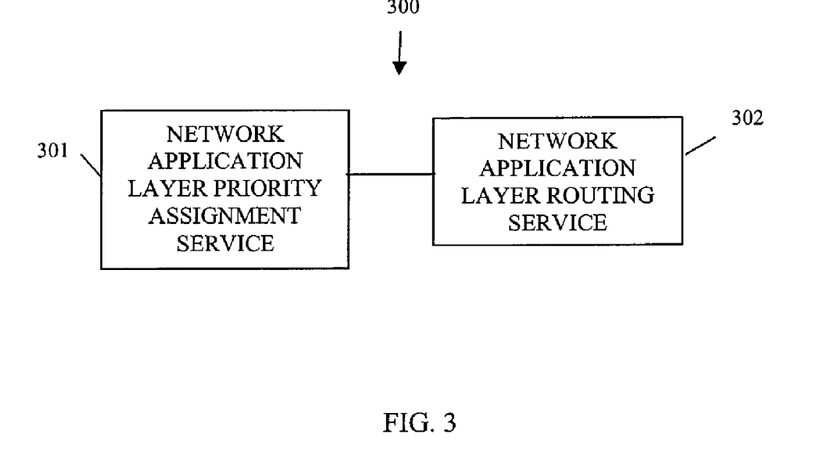
FIG. 3 is a diagram of a network application layer routing system, according to an example embodiment of the invention.

FIG. 3 is a diagram of a network application layer routing system 300, according to an example embodiment of the invention. The network application layer routing system 300 is implemented as instructions on or within a non-transitory machine-accessible and readable medium. The instructions when executed by one or more machines perform various aspects of the processing depicted with respect to the methods 100 and 200 of the FIGS. 1 and 2, respectively. The network application layer routing system 300 is also operational over a network and the network may be wired, wireless, or a combination of wired and wireless.

The network application layer routing system 300 includes a network application layer priority assignment service 301 and an network application layer routing service 302. Each of these components and their interactions with one another will now be discussed in turn.

The network application layer priority assignment service 301 is implemented in a machine-accessible and readable medium and is to process on a first machine of a network. Example processing associated with the network application layer priority assignment service 301 was described in detail above with reference to the routing represented by the method 100 of the FIG. 1 and with respect to the network application layer routing service represented by the method 200 of the FIG. 2.

The network application layer priority assignment service 301 resolves a priority for a request for a particular service. The request is made by a principal and the priority resolved at an application layer of the network.

The network application layer priority assignment service 301 can assign the priority in a variety of manners, some of which were discussed in detail above with reference to the methods 100 and 200 of the FIGS. 1 and 2, respectively.

In an embodiment, the network application layer priority assignment service 301 uses a policy to assign the priority to the request in response to one or more of the following: an identity associated with the principal, an identity associated with the particular service, a role assigned to the principal, and/or a particular privilege level assigned to the principal.

The network application layer routing service 302 is implemented in a machine-accessible and readable medium and is to process on the first machine. Example processing associated with the network application layer routing service 302 was described in detail above with reference to the routing service represented by the method 100 of the FIG. 1 and with respect to the network application layer routing service represented by the method 200 of the FIG. 2.

The network application layer routing service 302 uses the priority to select a particular processing environment (set or servers, cluster, particular device, etc.) for handling the request. A plurality of processing environments is available for selection. Each processing environment having an instance of the particular service that can handle the request. Moreover, the routing is initially effectuated or caused to take place from the application layer of the network once the priority is resolved by the network application layer priority assignment service 301.

According to an embodiment, the network application layer routing service 302 overrides an initial attempted routing of the request, which is made at the transport layer of the network, such as Layer 4 of an OSI network architecture.

In an particular situation, the network application layer routing service 302 selects the particular processing environment as a higher performing processing environment relative to remaining ones of the processing environments when the priority is identified as a high priority. Similarly, the network application layer routing service 302 selects the particular processing environment as a lower performing processing environment relative to the remaining ones of the processing environments when the priority is identified as a low priority.

The designation as to what is a higher performing and lower performing processing environment can be done via a predefined designation, via dynamic evaluation of conditions on each of the processing environments, evaluation or policy, evaluation of properties or attributes associated with the processing environments, etc.

In another case, the network application layer routing service 302 selects the particular processing environment as one which has more devices or hardware capabilities relative to remaining ones of the processing environments. This occurs when the priority is identified as a high priority. Similarly, the network application layer routing service 302 selects the particular processing environment as one which has less devices or hardware capabilities relative to the remaining ones of the processing environments when the priority is identified as a low priority.

In an embodiment, the first machine that processes the components 301 and 302 of the system 300 is a gateway, a router, or a proxy.

Figure 4:
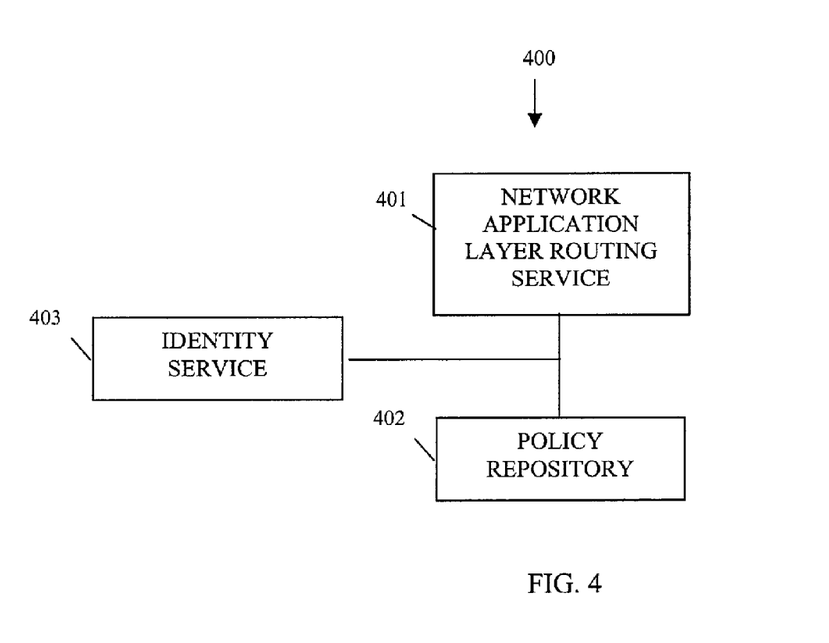
FIG. 4 is a diagram of another network application layer routing system, according to an example embodiment of the invention.

FIG. 4 is a diagram of another network application layer routing system 400, according to an example embodiment of the invention. The network application layer routing system 400 is implemented as instructions on or within a non-transitory machine-accessible and readable medium. The instructions when executed by a machine perform various aspects of the processing depicted with respect to the methods 100 and 200 of the FIGS. 1 and 2, respectively and the processing associated with the system 300 of the FIG. 3. The network application layer routing system 400 is also operational over a network and the network may be wired, wireless, or a combination of wired and wireless. The network is a WAN, such as but not limited to the Internet and the WWW.

The network application layer routing system 400 includes a network application layer routing service 401 and policy repository 402. In an embodiment, the network application layer routing system 400 may also include an identity service 403. Each of these components and their interactions with one another will now be discussed in turn.

The network application layer routing service 401 is implemented in a machine-accessible and readable medium and is to process on a first machine of the network. Example processing of the network application layer routing service 401 was described in detail above with reference to the methods 100 and 200 of the FIGS. 1 and 2, respectively, and with reference to the system 300 of the FIG. 1.

The network application layer routing service 401 authenticates (directly or indirectly, such as via a trusted third-party service (identity service), etc.) a principal for access to a particular service. The particular service is available from a first processing environment and a second processing environment. This occurs when independent instances of the particular service processes in both the first processing environment and the second processing environment.

The network application layer routing service 401 accesses the policy repository 402 to acquire a policy in response to the authentication. Evaluation of the policy permits the network application layer routing service 401 to select the first processing environment or the second processing environment. Moreover, the network application layer routing service 401 processes at an application layer of the network, such as Layer 7 in an OSI network communication architecture.

In an embodiment, the network application layer routing service 401 uses an identity service to perform the authentication. In another embodiment, the network application layer routing service 401 authenticates the principal in response to an attestation that accompanies a request made from the principal for the particular service. Of course a variety of other authentication techniques may be used, such as the ones discussed above with reference to the method 200 of the FIG. 2.

The policy repository 402 is implemented in a machine-accessible and readable medium and is accessible to the first machine and the network application layer routing service 401. The policy repository 402 supplies policy that permits the network application layer routing service 401 to determine how to select the first processing environment over the second processing environment and vice versa. The policy can include a variety of conditions, such as selection based on designation of the processing environments as higher or lower performing processing environments, evaluation of the devices or hardware capabilities of the processing environments, etc.

According to an embodiment, the network application layer routing system 400 also includes an identity service 403. The identity service 403 is implemented in a machine-accessible and readable medium and is to process on the first machine or another different machine of the network. Example references to identity services 403 were discussed and incorporated by reference herein and above.

The identity service 403 interacts with the network application layer routing service 401 to assist in authenticating the principal. The authentication provides attributes that the network application layer routing service 401 uses to acquire the policy from the policy repository 402. In some cases, the identity service 403 can even supply a handle, identity, or reference to the policy repository 402 to the network application layer routing service 401.

In an embodiment, the first processing environment has different processor and memory capabilities from that of the second processing environment.

It is now appreciated how application layer routing may be achieved to account for privileged requests and principals. This technique is unlike conventional approaches that perform load balancing routing at the transport layer of network communication.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    identifying a request over a network from a principal, the request directed to a particular service;
    resolving, determining, and assigning a priority for the request at an application layer of the network, the application layer is Layer 7 in a network stack, which is the top layer of the network stack, the priority is for the principal of the request;
    dynamically routing the request, in response to the priority, to a processing environment having an instance of the particular service and thereby overriding an attempted routing of the request to a different processing environment having a different independent instance of the particular service, the attempted routing is done at a transport layer of the network, which is Layer 4 of the network stack, the transport layer is tricked and forced to perform the routing.

2. The method of claim 1 further comprising, processing the method as one or more of the following: a network router, a network gateway, and a reverse proxy.

3. The method of claim 1, wherein resolving the priority further includes:
    obtaining an identity for the principal from an identity service;
    acquiring a policy in response to the identity; and
    assigning the priority in response to the policy.

4. The method of claim 1, wherein resolving further includes:
    detecting a role assignment for the principal making the request;
    acquiring a policy in response to the role assignment; and
    assigning the priority in response to the policy.

5. The method of claim 1, wherein routing further includes identifying the processing environment as a set of one or more high-performance devices having processor and memory capabilities that permit the instance of the particular service to accelerate processing of the request, wherein the priority is identified as a higher priority necessitating the accelerated processing.

6. The method of claim 1, wherein routing further includes identifying the processing environment as a set of one or more lower-performing devices having partially loaded processor and memory capabilities, wherein the priority is identified as a lower priority necessitating potential delayed processing.

7. The method of claim 1, wherein routing further includes identifying the processing environment in response to a total number of devices associated with the processing environment relative to one or more other processing environments and their total number of devices, and wherein the priority dictates whether the processing environment is to have more devices or less devices relative to the other processing environments.

8. A system, comprising:
- a network application layer priority assignment service implemented in a non-transitory machine-accessible and readable medium and to process on a first machine of a network; and
- a network application layer routing service implemented in a non-transitory machine-accessible and readable medium and to process on the first machine; and
- wherein the network application layer priority assignment service is to resolve, determine, and assign a priority for a request for a particular service, the request made by a principal and the priority is dynamically resolved, determined, and assigned at an application layer of the network, which is a top layer and Layer 7 of a network stack, and the network application layer routing service is to use the priority to select a particular processing environment for handling the request, a plurality of processing environments are available with each of the processing environments having an independent instance of the particular service that can handle the request, and the routing initially takes place at the application layer of the network once the priority is resolved, initial attempted routing at a transport layer or Layer 4 of the network stack is overridden and the transport layer is tricked into performing the routing assigned at the Layer 7 of the network stack.

9. The system of claim 8, wherein the network application layer routing service is to override initial attempted routing of the request made at a transport layer of the network.

10. The system of claim 8, wherein the network application layer routing service selects the particular processing environment as a higher performing processing environment relative to remaining ones of the processing environments when the priority is identified as a high priority, and wherein the network application layer routing service selects the particular processing environment as a lower performing processing environment relative to the remaining ones of the processing environments when the priority is identified as a low priority.

11. The system of claim 8, wherein the network application layer routing service selects the particular processing environment as one having more devices relative to remaining ones of the processing environments when the priority is identified as a high priority, and wherein the network application layer routing service selects the particular processing environment as one having less devices relative to the remaining ones of the processing environments when the priority is identified as a low priority.

12. The system of claim 8, wherein the first machine is one or more of the following: a gateway, a router, and a proxy.

13. The system of claim 8, wherein network application layer priority assignment service uses a policy to assign the priority to the request in response to one or more of the following: an identity associated with the principal, an identity associated with the particular service, a role assigned to the principal, and a particular privilege level assigned to the principal.

* * * * *